United States Patent
De Almeida E De Vincenzo et al.

(10) Patent No.: US 12,164,741 B2
(45) Date of Patent: Dec. 10, 2024

(54) ACTIVATING A SNAP POINT IN AN ARTIFICIAL REALITY ENVIRONMENT

(71) Applicant: Meta Platforms Technologies, LLC, Menlo Park, CA (US)

(72) Inventors: Camila Cortes De Almeida E De Vincenzo, Seattle, WA (US); Hayden Schoen, Evanston, IL (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 106 days.

(21) Appl. No.: 17/717,622

(22) Filed: Apr. 11, 2022

(65) Prior Publication Data
US 2023/0325046 A1 Oct. 12, 2023

(51) Int. Cl.
| | |
|---|---|
| *G06F 3/04815* | (2022.01) |
| *G02B 27/00* | (2006.01) |
| *G06F 3/01* | (2006.01) |
| *G06F 3/0486* | (2013.01) |
| *G06T 19/00* | (2011.01) |
| *H04L 67/52* | (2022.01) |
| *H04W 4/021* | (2018.01) |

(52) U.S. Cl.
CPC ..... *G06F 3/04815* (2013.01); *G02B 27/0093* (2013.01); *G06F 3/013* (2013.01); *G06F 3/0486* (2013.01); *G06T 19/006* (2013.01); *H04L 67/52* (2022.05); *H04W 4/021* (2013.01)

(58) Field of Classification Search
CPC .... G06F 3/04815; G06F 3/013; G06F 3/0486; G02B 27/0093; H04L 67/52; H04M 1/72457; H04M 3/42348; H04W 4/021; H04W 4/022; H04W 4/029; G06T 19/006
See application file for complete search history.

(56) References Cited

U.S. PATENT DOCUMENTS

| | | |
|---|---|---|
| 6,066,954 A | 5/2000 | Gershenfeld et al. |
| 6,842,175 B1 | 1/2005 | Schmalstieg et al. |

(Continued)

FOREIGN PATENT DOCUMENTS

WO 2018235371 A1 12/2018

OTHER PUBLICATIONS

European Search Report for European Application No. 21172954.6, mailed Oct. 29, 2021, 11 pages.

(Continued)

*Primary Examiner* — Nicholas Ulrich
(74) *Attorney, Agent, or Firm* — Potomac Law Group PLLC; Dannon G. Allbee

(57) ABSTRACT

A user uses "snap points" to activate virtual objects and/or to transition virtual objects from body-locked or head-locked (i.e., "leashed") to world-locked. A snap point is a specific location in the user's artificial-reality (XR) world. When the user assumes a position near to where he was when he previously defined a snap point, the object ceases to be leashed and instead locks to the snap point (i.e., the object becomes "world-locked"). Until the user's distance from where he was when he defined the snap point exceeds a threshold value, the object remains stably world-locked at the snap point. When the user moves more than the threshold, the object releases from the snap point, returns to its previously defined leashed mode, and follows the user through the XR world as previously.

20 Claims, 11 Drawing Sheets

(56) References Cited

U.S. PATENT DOCUMENTS

| | | |
|---|---|---|
| 7,542,040 B2 | 6/2009 | Templeman |
| 7,701,439 B2 | 4/2010 | Hillis et al. |
| 8,493,383 B1 | 7/2013 | Cook et al. |
| 8,558,759 B1 | 10/2013 | Prada Gomez et al. |
| 8,831,794 B2 | 9/2014 | Persaud et al. |
| 8,902,227 B2 | 12/2014 | Harrison |
| 8,947,351 B1 | 2/2015 | Noble |
| 9,052,161 B2 | 6/2015 | Page |
| 9,117,274 B2 | 8/2015 | Liao et al. |
| 9,159,140 B2 | 10/2015 | Hoof et al. |
| 9,292,089 B1 | 3/2016 | Sadek |
| 9,342,230 B2 | 5/2016 | Bastien et al. |
| 9,412,010 B2 | 8/2016 | Kawaguchi et al. |
| 9,477,368 B1 | 10/2016 | Filip et al. |
| 9,526,983 B2 | 12/2016 | Lin |
| 9,619,712 B2 | 4/2017 | Mullins et al. |
| 9,811,721 B2 | 11/2017 | Tang et al. |
| 9,817,472 B2 | 11/2017 | Lee et al. |
| 9,818,231 B2 | 11/2017 | Coffey et al. |
| 9,821,224 B2 | 11/2017 | Latta et al. |
| 9,830,395 B2 | 11/2017 | Mullins et al. |
| 9,864,910 B2 | 1/2018 | Mullins et al. |
| 9,886,096 B2 | 2/2018 | Kang et al. |
| 9,910,506 B2 | 3/2018 | Spießl et al. |
| 9,940,750 B2 | 4/2018 | Dillavou et al. |
| 10,019,131 B2 | 7/2018 | Welker et al. |
| 10,026,231 B1 | 7/2018 | Gribetz et al. |
| 10,043,279 B1 | 8/2018 | Eshet |
| 10,048,760 B2 | 8/2018 | Abercrombie |
| 10,067,636 B2 | 9/2018 | Palmaro |
| 10,102,676 B2 | 10/2018 | Yajima et al. |
| 10,133,342 B2 | 11/2018 | Mittal et al. |
| 10,163,001 B2 | 12/2018 | Kim et al. |
| 10,168,873 B1 | 1/2019 | Holz et al. |
| 10,181,218 B1 | 1/2019 | Goetzinger, Jr. et al. |
| 10,220,303 B1 | 3/2019 | Schmidt et al. |
| 10,235,807 B2 | 3/2019 | Thomas et al. |
| 10,248,284 B2 | 4/2019 | Itani et al. |
| 10,303,259 B2 | 5/2019 | Brunner et al. |
| 10,325,184 B2 | 6/2019 | Brunner et al. |
| 10,339,721 B1 | 7/2019 | Dascola et al. |
| 10,387,719 B2 | 8/2019 | Hutka et al. |
| 10,416,837 B2 | 9/2019 | Reif |
| 10,423,241 B1 | 9/2019 | Pham et al. |
| 10,451,875 B2 | 10/2019 | Sutherland et al. |
| 10,473,935 B1 | 11/2019 | Gribetz et al. |
| 10,481,755 B1 | 11/2019 | Ngo et al. |
| 10,521,944 B2 | 12/2019 | Sareen et al. |
| 10,535,199 B1 | 1/2020 | Bond et al. |
| 10,558,048 B2 | 2/2020 | Fukuda et al. |
| 10,592,067 B2 | 3/2020 | Merdan et al. |
| 10,617,956 B2 | 4/2020 | Black et al. |
| 10,621,784 B1 | 4/2020 | Khan et al. |
| 10,649,212 B2 | 5/2020 | Burns et al. |
| 10,657,694 B2 | 5/2020 | Sharma et al. |
| 10,726,266 B2 | 7/2020 | Sharma et al. |
| 10,802,582 B1 | 10/2020 | Clements |
| 10,802,600 B1 | 10/2020 | Ravasz et al. |
| 10,803,314 B2 | 10/2020 | Tian et al. |
| 10,818,071 B1 | 10/2020 | Hoppe et al. |
| 10,818,088 B2 | 10/2020 | Jones et al. |
| 10,824,247 B1 | 11/2020 | Henrikson et al. |
| 10,838,574 B2 | 11/2020 | Agarawala et al. |
| 10,859,831 B1 | 12/2020 | Pollard et al. |
| 10,890,653 B2 | 1/2021 | Giusti et al. |
| 10,890,967 B2 | 1/2021 | Stellmach et al. |
| 10,901,215 B1 | 1/2021 | Newcombe et al. |
| 10,922,894 B2 | 2/2021 | Sculli et al. |
| 10,943,388 B1 | 3/2021 | Hosenpud et al. |
| 10,970,936 B2 | 4/2021 | Osborn et al. |
| 11,019,283 B2 | 5/2021 | Carter et al. |
| 11,030,237 B2 | 6/2021 | Itani et al. |
| 11,030,788 B2 | 6/2021 | Grant |
| 11,073,902 B1 | 7/2021 | Rahimi et al. |
| 11,077,360 B2 | 8/2021 | Ohashi |
| 11,093,103 B2 | 8/2021 | Agarawala et al. |
| 11,099,638 B2 | 8/2021 | Johnson et al. |
| 11,163,417 B2 | 11/2021 | Hauenstein et al. |
| 11,170,576 B2 | 11/2021 | Ravasz et al. |
| 11,175,730 B2 | 11/2021 | Johnson et al. |
| 11,176,745 B2 | 11/2021 | Ravasz et al. |
| 11,178,376 B1 | 11/2021 | Tichenor et al. |
| 11,189,099 B2 | 11/2021 | Ravasz et al. |
| 11,195,320 B2 | 12/2021 | Lin et al. |
| 11,244,483 B2 | 2/2022 | Pollard et al. |
| 11,256,336 B2 | 2/2022 | Schoen |
| 11,257,280 B1 | 2/2022 | Pedrotti et al. |
| 11,294,475 B1 | 4/2022 | Pinchon et al. |
| 11,416,201 B2 | 8/2022 | Leppänen et al. |
| 11,474,610 B2 | 10/2022 | Lee |
| 11,609,625 B2 | 3/2023 | Johnson et al. |
| 11,625,103 B2 | 4/2023 | Schoen |
| 11,637,999 B1 | 4/2023 | Tichenor et al. |
| 11,741,649 B2 | 8/2023 | Pollard et al. |
| 11,809,617 B2 | 11/2023 | Johnson et al. |
| 11,972,040 B2 | 4/2024 | Johnson et al. |
| 2004/0224670 A1 | 11/2004 | Hull et al. |
| 2007/0003915 A1 | 1/2007 | Templeman |
| 2008/0089587 A1 | 4/2008 | Kim et al. |
| 2010/0306716 A1 | 12/2010 | Perez |
| 2011/0009241 A1 | 1/2011 | Lane et al. |
| 2011/0032257 A1 | 2/2011 | Peterson et al. |
| 2011/0154266 A1 | 6/2011 | Friend et al. |
| 2011/0254846 A1 | 10/2011 | Lee et al. |
| 2011/0267265 A1 | 11/2011 | Stinson |
| 2011/0310220 A1 | 12/2011 | McEldowney |
| 2012/0069168 A1 | 3/2012 | Huang et al. |
| 2012/0143358 A1 | 6/2012 | Adams et al. |
| 2012/0157198 A1 | 6/2012 | Latta et al. |
| 2012/0188279 A1 | 7/2012 | Demaine |
| 2012/0206345 A1 | 8/2012 | Langridge |
| 2012/0256967 A1 | 10/2012 | Baldwin et al. |
| 2012/0275686 A1 | 11/2012 | Wilson et al. |
| 2012/0293544 A1 | 11/2012 | Miyamoto et al. |
| 2012/0324213 A1 | 12/2012 | Ho et al. |
| 2013/0002551 A1 | 1/2013 | Imoto et al. |
| 2013/0022843 A1 | 1/2013 | Tohda |
| 2013/0026220 A1 | 1/2013 | Whelihan |
| 2013/0042296 A1 | 2/2013 | Hastings et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0211843 A1 | 8/2013 | Clarkson |
| 2013/0265220 A1 | 10/2013 | Fleischmann et al. |
| 2014/0125598 A1 | 5/2014 | Cheng et al. |
| 2014/0168217 A1 | 6/2014 | Kim et al. |
| 2014/0201666 A1 | 7/2014 | Bedikian et al. |
| 2014/0236996 A1 | 8/2014 | Masuko et al. |
| 2014/0357366 A1 | 12/2014 | Koganezawa et al. |
| 2014/0375691 A1 | 12/2014 | Kasahara |
| 2015/0009238 A1 | 1/2015 | Kudalkar |
| 2015/0035746 A1 | 2/2015 | Cockburn et al. |
| 2015/0054742 A1 | 2/2015 | Imoto et al. |
| 2015/0061998 A1 | 3/2015 | Yang et al. |
| 2015/0062160 A1 | 3/2015 | Sakamoto et al. |
| 2015/0062162 A1 | 3/2015 | Kim et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0176998 A1* | 6/2015 | Huang .................. H04W 4/021 |
| | | 701/400 |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0260474 A1 | 9/2015 | Rublowsky et al. |
| 2015/0261659 A1 | 9/2015 | Bader et al. |
| 2015/0317831 A1* | 11/2015 | Ebstyne ............. G02B 27/0172 |
| | | 345/419 |
| 2016/0027212 A1 | 1/2016 | Da Veiga et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0171771 A1 | 6/2016 | Pedrotti et al. |
| 2016/0210784 A1 | 7/2016 | Ramsby et al. |

(56) References Cited

U.S. PATENT DOCUMENTS

| | | |
|---|---|---|
| 2016/0231810 A1 | 8/2016 | Imoto et al. |
| 2016/0266386 A1* | 9/2016 | Scott ................. G06F 3/017 |
| 2016/0378291 A1 | 12/2016 | Pokrzywka |
| 2017/0060230 A1 | 3/2017 | Faaborg et al. |
| 2017/0060319 A1 | 3/2017 | Seo et al. |
| 2017/0109936 A1 | 4/2017 | Powderly et al. |
| 2017/0123487 A1 | 5/2017 | Hazra et al. |
| 2017/0139478 A1 | 5/2017 | Jeon et al. |
| 2017/0147078 A1 | 5/2017 | Van Laack et al. |
| 2017/0154467 A1 | 6/2017 | Hu |
| 2017/0192513 A1 | 7/2017 | Karmon et al. |
| 2017/0203213 A1 | 7/2017 | Stafford |
| 2017/0205892 A1 | 7/2017 | Petrovskaya et al. |
| 2017/0236320 A1 | 8/2017 | Gribetz et al. |
| 2017/0237789 A1 | 8/2017 | Harner et al. |
| 2017/0243401 A1 | 8/2017 | Tanaka et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0364198 A1 | 12/2017 | Yoganandan et al. |
| 2017/0372499 A1 | 12/2017 | Lalonde |
| 2018/0003982 A1 | 1/2018 | Burns et al. |
| 2018/0005443 A1 | 1/2018 | Poulos et al. |
| 2018/0024623 A1 | 1/2018 | Faaborg et al. |
| 2018/0059901 A1 | 3/2018 | Gullicksen |
| 2018/0095635 A1 | 4/2018 | Valdivia et al. |
| 2018/0107278 A1 | 4/2018 | Goel et al. |
| 2018/0113599 A1 | 4/2018 | Yin |
| 2018/0144556 A1 | 5/2018 | Champion et al. |
| 2018/0224928 A1 | 8/2018 | Ross et al. |
| 2018/0307303 A1 | 10/2018 | Powderly et al. |
| 2018/0310116 A1 | 10/2018 | Arteaga et al. |
| 2018/0322701 A1 | 11/2018 | Pahud et al. |
| 2018/0335925 A1 | 11/2018 | Hsiao et al. |
| 2018/0349690 A1 | 12/2018 | Rhee et al. |
| 2018/0357780 A1 | 12/2018 | Young et al. |
| 2019/0033989 A1 | 1/2019 | Wang et al. |
| 2019/0050062 A1 | 2/2019 | Chen et al. |
| 2019/0094981 A1 | 3/2019 | Bradski et al. |
| 2019/0097981 A1 | 3/2019 | Koyun et al. |
| 2019/0102941 A1 | 4/2019 | Khan et al. |
| 2019/0107894 A1 | 4/2019 | Hebbalaguppe et al. |
| 2019/0130655 A1 | 5/2019 | Gupta et al. |
| 2019/0188895 A1 | 6/2019 | Miller, IV et al. |
| 2019/0196577 A1 | 6/2019 | Sronipah et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0310757 A1 | 10/2019 | Lee et al. |
| 2019/0317596 A1 | 10/2019 | Sato |
| 2019/0340818 A1 | 11/2019 | Furtwangler |
| 2019/0355272 A1 | 11/2019 | Nusbaum et al. |
| 2019/0362557 A1 | 11/2019 | Lacey et al. |
| 2019/0362562 A1 | 11/2019 | Benson |
| 2019/0369391 A1 | 12/2019 | Cordesses et al. |
| 2019/0377416 A1 | 12/2019 | Alexander |
| 2020/0001461 A1 | 1/2020 | Cappello et al. |
| 2020/0012341 A1 | 1/2020 | Stellmach et al. |
| 2020/0033957 A1 | 1/2020 | Bieglmayer |
| 2020/0064908 A1 | 2/2020 | Boucher |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0103521 A1 | 4/2020 | Chiarella et al. |
| 2020/0103963 A1* | 4/2020 | Kelly ................. G10L 15/22 |
| 2020/0134895 A1 | 4/2020 | Pollard et al. |
| 2020/0143598 A1 | 5/2020 | Riordan |
| 2020/0218423 A1 | 7/2020 | Ohashi |
| 2020/0225736 A1 | 7/2020 | Schwarz et al. |
| 2020/0225758 A1 | 7/2020 | Tang et al. |
| 2020/0225830 A1 | 7/2020 | Tang et al. |
| 2020/0226814 A1 | 7/2020 | Tang et al. |
| 2020/0241646 A1 | 7/2020 | Hebbalaguppe et al. |
| 2020/0249746 A1 | 8/2020 | Gkaintatzis |
| 2020/0272231 A1 | 8/2020 | Klein et al. |
| 2020/0379576 A1 | 12/2020 | Chen et al. |
| 2021/0012113 A1 | 1/2021 | Petill et al. |
| 2021/0072817 A1 | 3/2021 | Bond et al. |
| 2021/0090331 A1 | 3/2021 | Ravasz et al. |
| 2021/0090333 A1 | 3/2021 | Ravasz et al. |
| 2021/0090337 A1 | 3/2021 | Ravasz et al. |
| 2022/0130100 A1 | 4/2022 | Pedrotti et al. |
| 2022/0358715 A1 | 11/2022 | Tanner et al. |
| 2023/0188533 A1 | 6/2023 | Lebeau et al. |
| 2023/0244321 A1 | 8/2023 | Schoen |

OTHER PUBLICATIONS

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/058648, mailed Jun. 16, 2022, 10 pages.

International Search Report and Written Opinion for International Application No. PCT/US2020/051763, mailed Feb. 3, 2021, 11 Pages.

International Search Report and Written Opinion for International Application No. PCT/US2020/052976, mailed Dec. 11, 2020, 10 Pages.

International Search Report and Written Opinion for International Application No. PCT/US2020/058648, mailed Feb. 23, 2021, 12 Pages.

International Search Report and Written Opinion for International Application No. PCT/US2021/038826, mailed Oct. 19, 2021, 12 pages.

Katz N., et al., "Extending Web Browsers with a Unity 3D-Based Virtual Worlds Viewer," IEEE Computer Society, Sep./Oct. 2011, vol. 15 (5), pp. 15-21.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Qiao X., et al., "Web AR: A Promising Future for Mobile Augmented Reality—State of the Art, Challenges, and Insights," Proceedings of the IEEE, Apr. 2019, vol. 107 (4), pp. 651-666.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

Srinivasa R.R., "Augmented Reality Adaptive Web Content," 13th IEEE Annual Consumer Communications & Networking Conference (CCNC), 2016, pp. 1-4.

"Unity Gets Toolkit for Common AR/VR Interactions," Unity XR interaction Toolkit Preview [Online], Dec. 19, 2019 [Retrieved on Apr. 7, 2020], 1 page, Retrieved from the Internet: URL: http://youtu.be/ZPhv4qmT9EQ.

Office Action mailed Jan. 31, 2024 for European Patent Application No. 21172954.6, filed on May 10, 2021, 8 pages.

* cited by examiner

ACTIVATING A SNAP POINT IN AN ARTIFICIAL REALITY ENVIRONMENT

TECHNICAL FIELD

The present disclosure is directed to using snap points for transitioning virtual objects from being body-locked or head-locked to a user to being world-locked.

BACKGROUND

As virtual objects proliferate in an artificial-reality (XR) world, a user begins to need sophisticated tools to organize them. A user moving through the XR world may wish to have one application-controlled object (e.g., an active tablet augment) leashed to him, that is, to remain in the same relative position to his body (or head) no matter where he moves. This can become annoying, however, if the user assumes a relatively stationary position (e.g., sits down), and the leashed object continues to move in response to minor variations in the user's posture.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
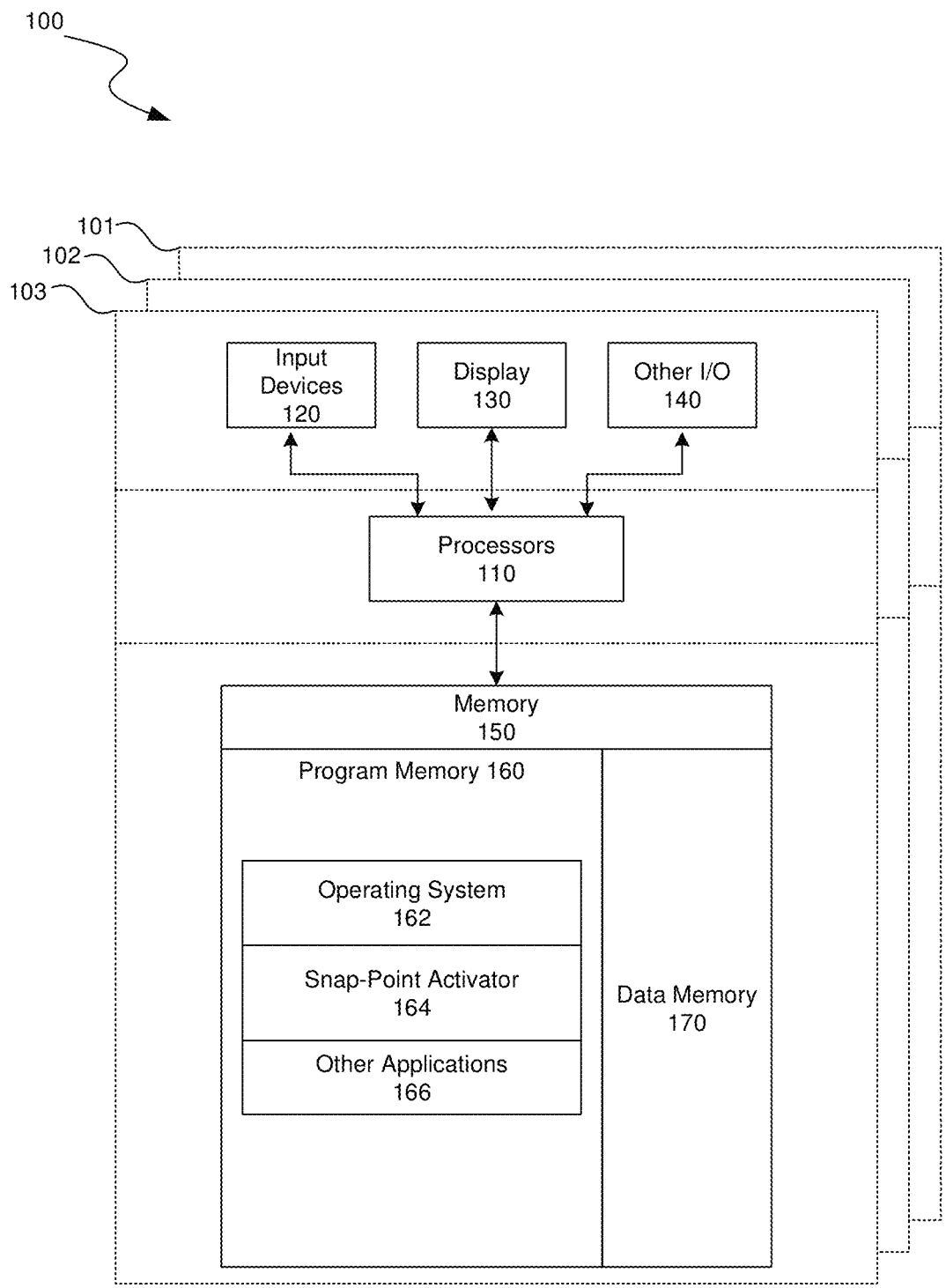
FIG. 1 is a block diagram illustrating an overview of devices on which some implementations of the present technology can operate.

Aspects of the present disclosure are directed to using snap points to transition virtual objects from being body-locked or head-locked (i.e., "leashed") to a user to being world-locked. A snap point is a specific location in the user's XR world. When the user assumes a stationary position near to where he was when he previously defined a snap point, the virtual object ceases to be leashed and instead locks to the snap point (i.e., the object becomes "world-locked"). Until the user's distance from where he was when he defined the snap point exceeds a threshold value, the object remains stably world-locked at the snap point. When the user moves more than the threshold distance away from the snap point, the object releases from the snap point, returns to its previously defined leashed mode, and follows the user through the XR world as a leashed object.

When defining the snap point, the user can specify any number of criteria to be satisfied before the snap point activates. In addition to the user's proximity to the snap point, for example, the user can set a gaze direction, and thus the snap point only becomes active when the user is within a set distance from where he was when he defined the snap point and also is directing his gaze within a set angle of his gaze direction when he defined the snap point.

In some variations, a user can define a contextually aware snap point at a particular location (absolute or relative to the user) and set a criterion for the snap point associated with a particular context (e.g., an activity) and with a particular virtual object. If the user approaches the location where he was when he defined the snap point and is seen to be in that context (e.g., to engage in that particular activity), then the snap point brings up the specified virtual object. For example, a snap point in the kitchen launches an interactive recipe object when the user is seen to prepare to start cooking, but the recipe object is not launched if the user is simply standing in the kitchen, not preparing to cook, near where he was when he defined the snap point.

In some variations, a user can associate each of a set of nearby snap points with each of a set of virtual objects, so that if the user approaches the location where he was when he defined the set of snap points with the set of objects leashed to him, then each object snaps to its own snap point, thus keeping them from colliding.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing XR systems do not support automatic transitioning of virtual objects from being leashed to being world-locked. Leashed virtual objects can be very annoying once the user becomes relatively stationary, these objects "bobbing" around to every slight and unintentional motion of the user. To respond, the user must either manually world-lock her leashed virtual objects, again and again, whenever she becomes stationary for a while or, possibly out of frustration, simply de-activate the leashed virtual objects. Neither response is optimal. The snap-point activator system and methods disclosed herein are expected to overcome these deficiencies in existing systems. By spending a few moments defining a snap point, the user is relieved of manually handling the transitions in the future. With context-aware snap points, a useful virtual object automatically comes into being just when the user may be in need of its services. By handling these transitions, the present technology allows for more seamless, lower friction interactions with virtual objects thus enhancing the value of those virtual objects and the value of the systems running the artificial reality environment.

Several implementations are discussed below in more detail in reference to the figures. FIG. 1 is a block diagram illustrating an overview of devices on which some implementations of the disclosed technology can operate. The devices can comprise hardware components of a computing system 100 that support snap points in an artificial reality environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a snap-point activator 164, and other application programs 166. Memory 150 can also include data memory 170 that can include, e.g., snap-point definitions, user-activity profiles and history, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
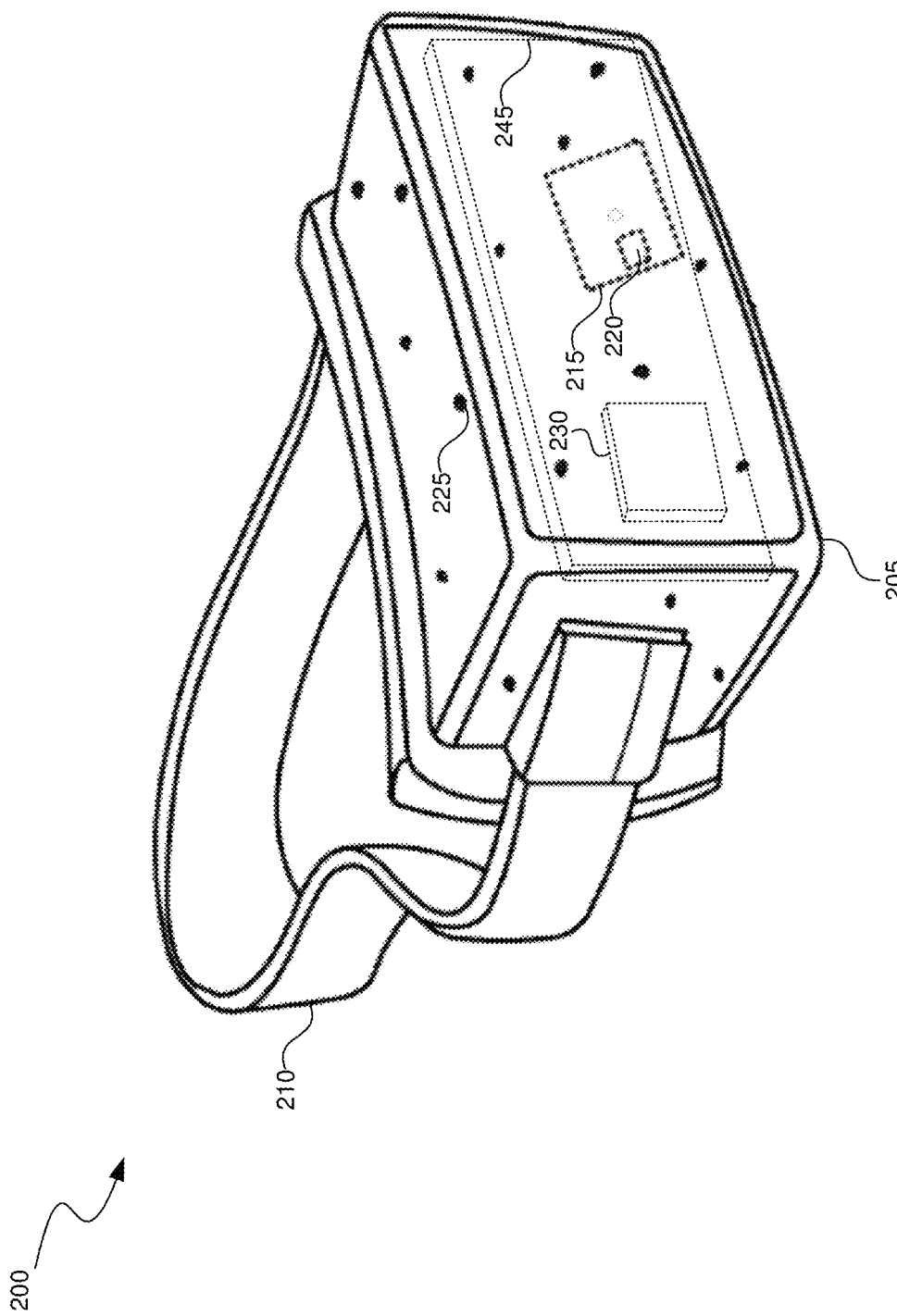
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
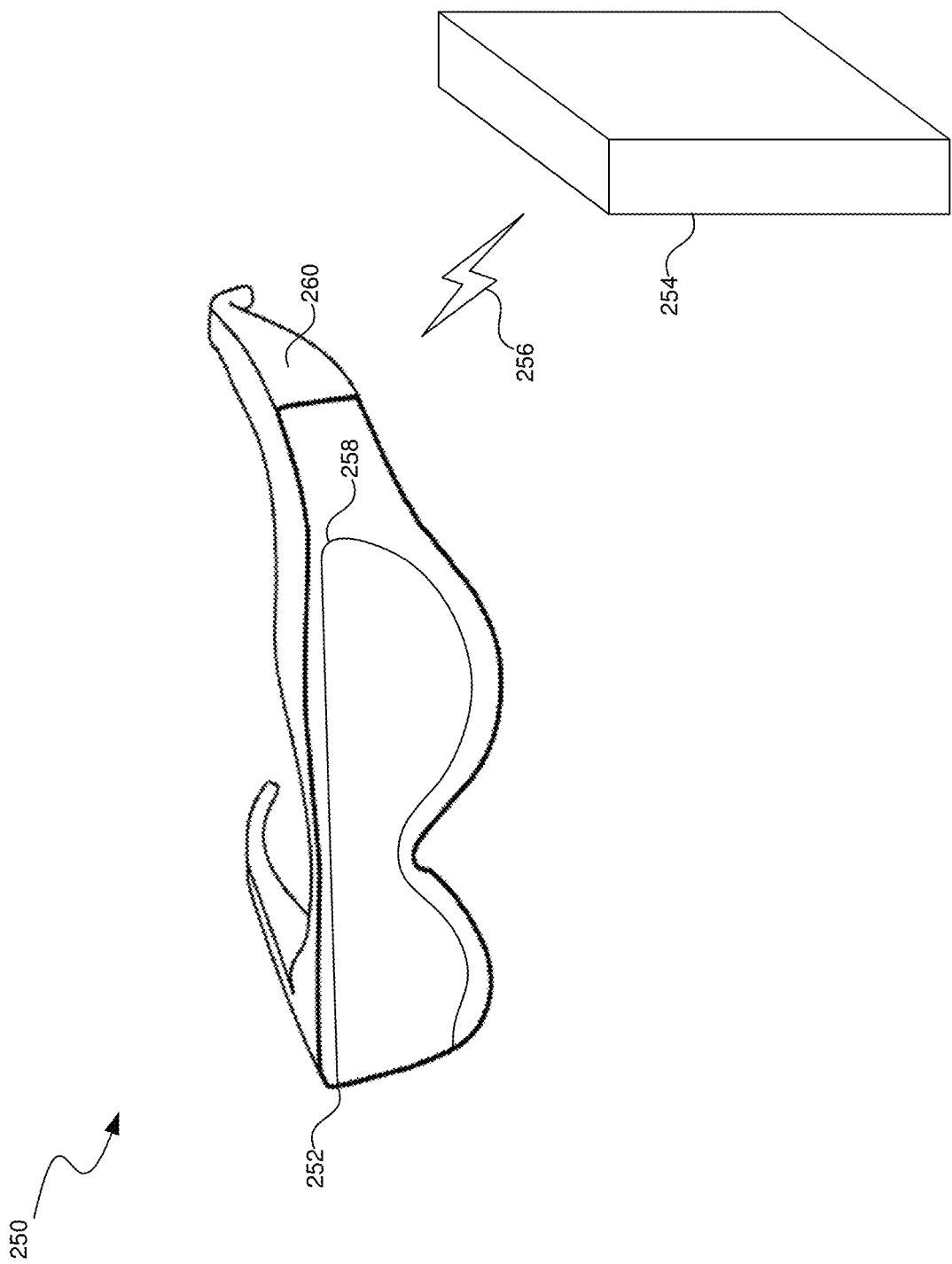
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
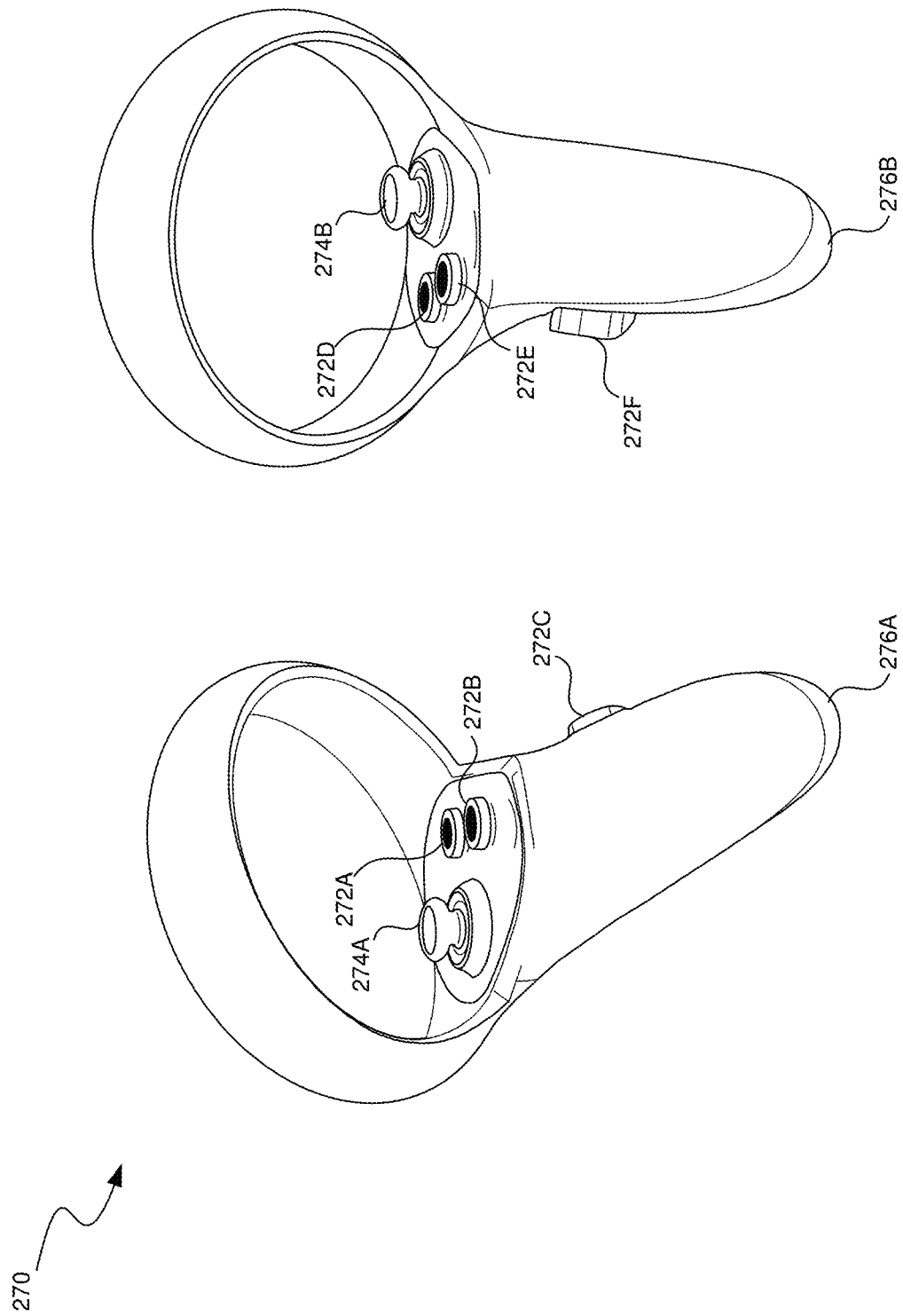
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
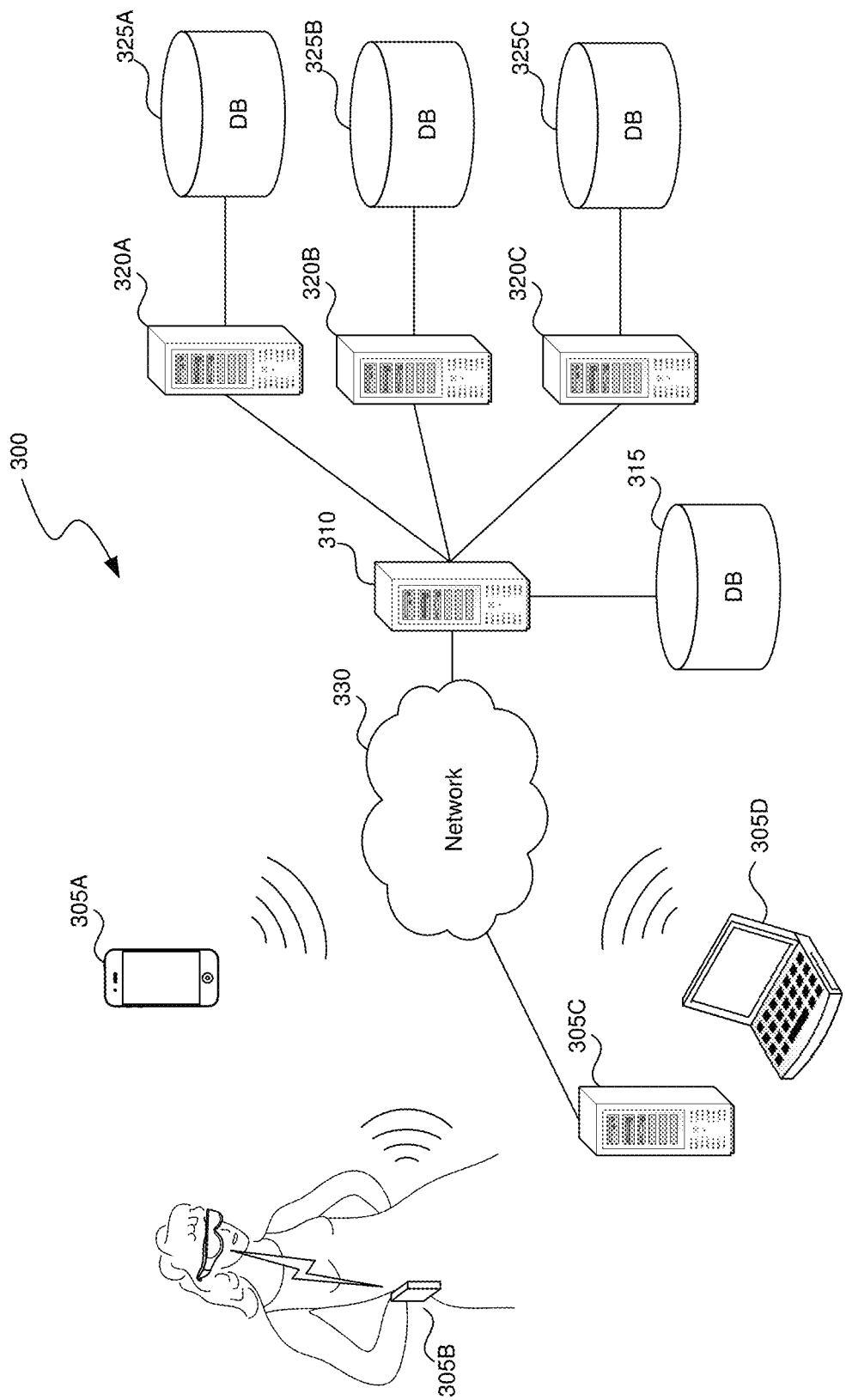
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
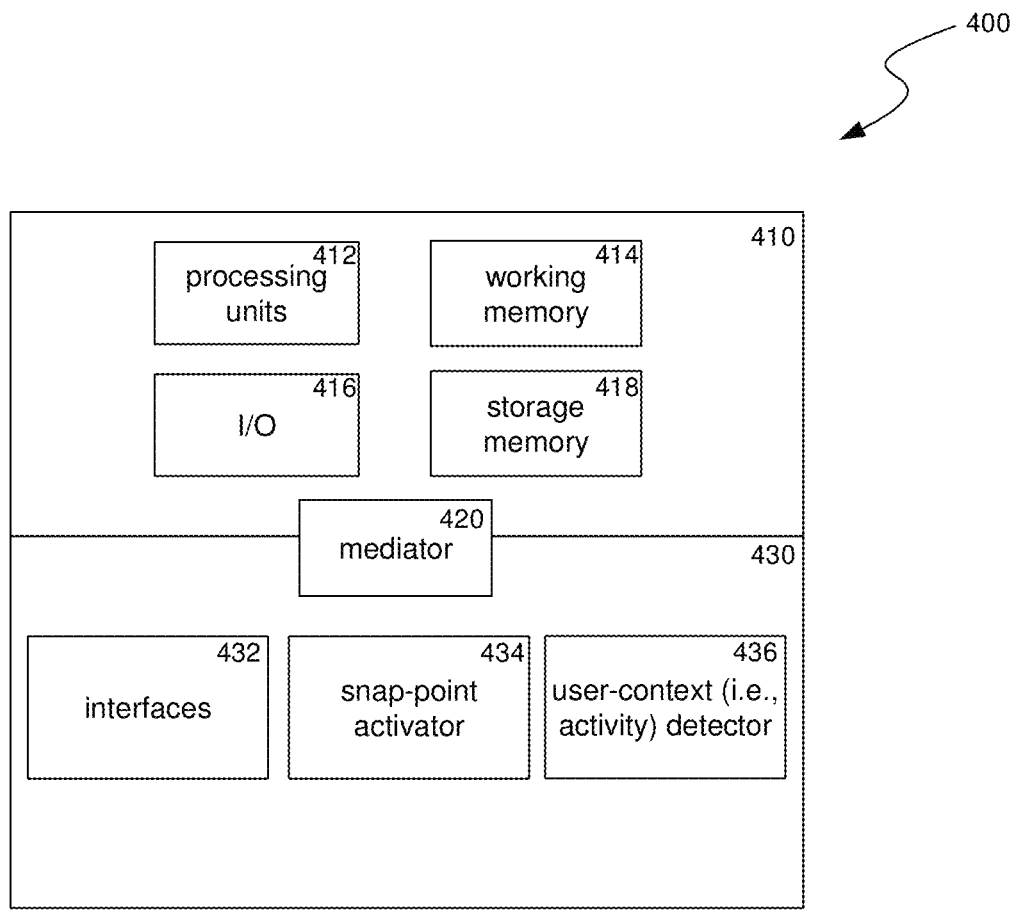
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for defining and managing snap points. Specialized components 430 can include a snap-point activator 434, a user-context detector 436, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The snap-point activator 434 determines when the criteria for activating a snap point are satisfied and, when they are, takes the appropriate action to, for example, world-lock to the snap point a previously leashed virtual object. The snap-point activator 434 also determines when the criteria for de-activating the snap point are satisfied (which can, in some variations, mean that the criteria for activating the snap point are no longer satisfied) and, when they are, takes the appropriate action such as returning a world-locked virtual object to its leashed state.

The criteria associated with some snap points can include a user's current context, for example, his orientation or the activity he is presently pursuing. The user-context detector 436 determines this context and, as appropriate, delivers that determination to the snap-point activator 434 for its use.

Inputs to the user-context detector 436 can include a user's interaction with a specific virtual object. If the user interacts with a virtual object for an online chess game, for instance, then the user-context detector 436 determines from that interaction what the user's current activity is. In some variations, the user need not have associated this virtual object with its activity. Instead, the user-context detector 436 can know the functions of the virtual object and determine the user's activity from that.

The user-context detector 436 can in some variations determine the user's activity from his physical location, the time of day, and the user's normal daily schedule. Also or instead of the above, the user-context detector 436 can make its determination based on the user's interaction with a work-related virtual object or other application.

More generally, the user-context detector 436 can access feeds from whatever devices are associated with the user (e.g., visual and audio feeds and/or IMU data from the user's HMD 200, activity of the user's cellphone, and the like). The user-context detector 436 can analyze all of this information (which may include sending queries to remote servers) to make a context determination.

The user-context detector 436 can use information from devices outside the artificial reality environment. If the user is sitting on the couch and the television is on, the user-context detector 436 determines the user's activity as "watching television" or, more specifically from viewing the television screen, "watching 'Saving Private Ryan.'" But if the user is in the same location and the television is off, then the user-context detector 436 may see that the user is "reading a book." If historical information about the user's activities is available to the user-context detector 436, then the user-context detector 436 can use that to inform its decision making. For example, without historical information, the user-context detector 436 might determine that the user's current status is "singing." With the historical information that the user is a professional singer, the user-context detector 436 may refine that status to either "practicing" or "performing." The user-context detector 436 can also ask the user what activity he is currently engaged in. If the user responds with an activity that is unfamiliar to the user-context detector 436, or responds with an activity that is not addressed in the user's profile, then the user-context detector 436 can ask for clarification. In all of the above examples, the user-context detector 436 can make intelligent assessments of the user's current context and activity and deliver that assessment to the snap-point activator 434.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
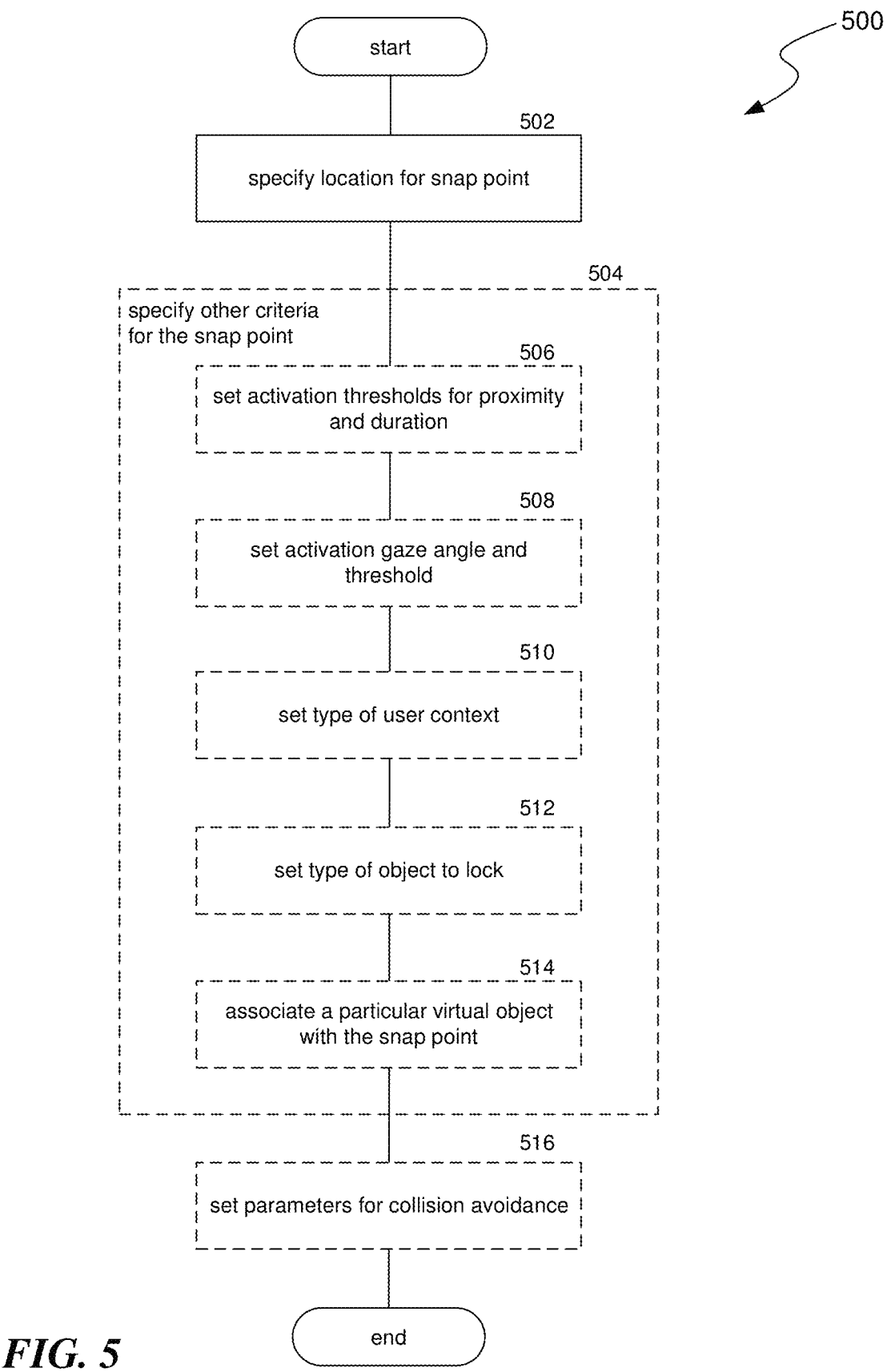
FIG. 5 is a flow diagram illustrating a process used in some implementations of the present technology for setting a snap point.

FIG. 5 is a flow diagram illustrating a process 500 used in some implementations for defining a snap point. Process 500 can be invoked by a user in an artificial reality environment whenever he wishes to define a new snap point, for example by issuing a spoken command, activating a control on a virtual augment, manually placing a virtual object at a location, etc. In some variations, the user can run process 500 to define a snap point while outside of the artificial reality environment and can then import the snap point into the artificial reality environment. Process 500 can run as an application of the user's artificial reality environment and can run on the user's local XR system. In some variations, process 500 can run on an XR server remote from the user.

At block 502, process 500 begins to define a snap point. Each snap point can be associated with a particular location, either real or virtual, in the user's environment. In some variations, the user can define the snap point's location with respect to his current position and location. To do so, in some variations, at block 502 the user can first move to the location to be associated with the snap point. For example (also see FIG. 7B and accompanying text), the user at block 502 can sit on a couch and can define a new snap point associated with the user's position at the couch's location.

While any block can be removed or rearranged in various implementations, blocks 504 through 516 are shown in dashed lines to indicate there are specific instances where these blocks are skipped.

At block 504, process 500 can specify any number of other criteria for the snap point. The remainder of the discussion of process 500 addresses a few of these other criteria, but there is no practical limit to the number and types of criteria that can be associated with a snap point. In various implementations, the parameters set in blocks 504-516 can be explicitly set by a user, or set based on inferences such as by using default values, values determined for the context, values determined based on selections from other similar users, etc.

At block 502, the user defines a location criterion associated with the new snap point. In some cases, that location criterion can be refined at block 506. Here, process 500 can add proximity and duration threshold criteria to the location criterion of block 502. Again using the example of a snap point associated with the user sitting on a couch, the proximity criterion can be quite specific: the snap is only activated when the user is stationary, e.g., sitting, at this particular place on the couch. If the user is sitting elsewhere on the couch or is standing near the couch, the snap point is not activated. (See FIG. 6 and accompanying text for a discussion of snap-point activation with respect to the criteria defined by process 500.) Similarly, the user can specify that this snap point is only activated if the user remains sitting on the couch for at least 30 seconds. In some variations, proximity and duration threshold criteria can be XR system defaults automatically associated with every snap point upon creation. The user can override those defaults if he so chooses.

At block 508, process 500 can associate a gaze direction with the snap point. For example, the snap point can be activated only if the user is on the couch and gazing at a blank portion on the far wall rather than, say, gazing at a television. In some variations, the user sets the gaze direction as his current gaze direction when defining the snap point. That is, "activate a new snap point whenever I am in the current location and my gaze is directed in the same direction as it currently is." Similarly to the situation with the location proximity threshold, the user can set a threshold range of angles (or the XR system can provide a default threshold range) within which his current gaze is considered to match the gaze direction criterion associated with the snap point.

At block 510, process 500 allows the user to associate a current context with the snap point. Here, "context" is meant to be widely understood. It can include the user's poise (e.g., sitting on the couch rather than standing near it), time of day, number of people detected in the same room with the user, social media factors (e.g., posted status, connection with proximate people, etc.), detected activity, system state, or other factors that the user-context detector 436 can report. In some variations, the context can include what specific activity the user is currently pursuing. For example, for a snap point defined for when the user is standing near a kitchen stove, the context can include "preparing a meal." In various implementations, process 500 can automatically associate the snap point with the determined activity of the user when the snap point was defined or the user can select an activity, whether or not the user was previously engaged in that activity at the snap point. If the user is standing at that location, but the user-context detector 436 does not report that the user is preparing a meal, then this particular snap point should not be activated. See FIG. 7C and the accompanying text for an illustration of this example. Other examples of context and activity are discussed above in relation to the user-context detector 436 of FIG. 4.

At block 512, process 500 allows the user to specify criteria that a leashed virtual object should satisfy in order to be snapped to the snap point. For example, a user may have several leashed virtual objects accompanying him but only wants the virtual tablet object to snap to the snap point. Other virtual objects may be unaffected or can be de-activated when the snap point is activated.

At block 514, process 500 allows the user to associate one or more particular virtual objects with the snap point, to be enabled in the artificial reality environment when the snap point is activated. As discussed below in relation to block 608 of FIG. 6, these particular virtual objects may not be leashed to the user when the snap point is activated, but instead are hidden or not yet invoked. These virtual objects become active when their snap point is activated. FIG. 7C presents an example where a snap point is activated when a user is detected in the kitchen starting to prepare a meal. The snap point is associated with a virtual recipe object and brings up that virtual recipe object when activated.

At block 516, process 500 responds to the fact that a user can approach one or more snap points corresponding to multiple virtual objects. When the multiple virtual objects are snapped, process 516 can prevent them from overlapping or colliding. Discussed above in relation to block 512 is the possibility that one of those virtual objects is snapped to the snap point while the others are de-activated. In another possibility, multiple "sub-snap points" can be defined by the user at block 516. These sub-snap points can form, for example, a grid (e.g., of the user's field of view) onto which the user's leashed objects are snapped when the snap point is activated. The user can specify that a leashed virtual tablet object, for example, be snapped to a central location in the grid while the other leashed objects be snapped to locations around the virtual tablet object in a manner so that the virtual objects do not collide as viewed by the user. In another variation, following the discussion of the virtual recipe object discussed above at block 514, the new virtual object may be given central place, while the user's leashed virtual objects are placed around it to avoid collisions.

Figure 6:
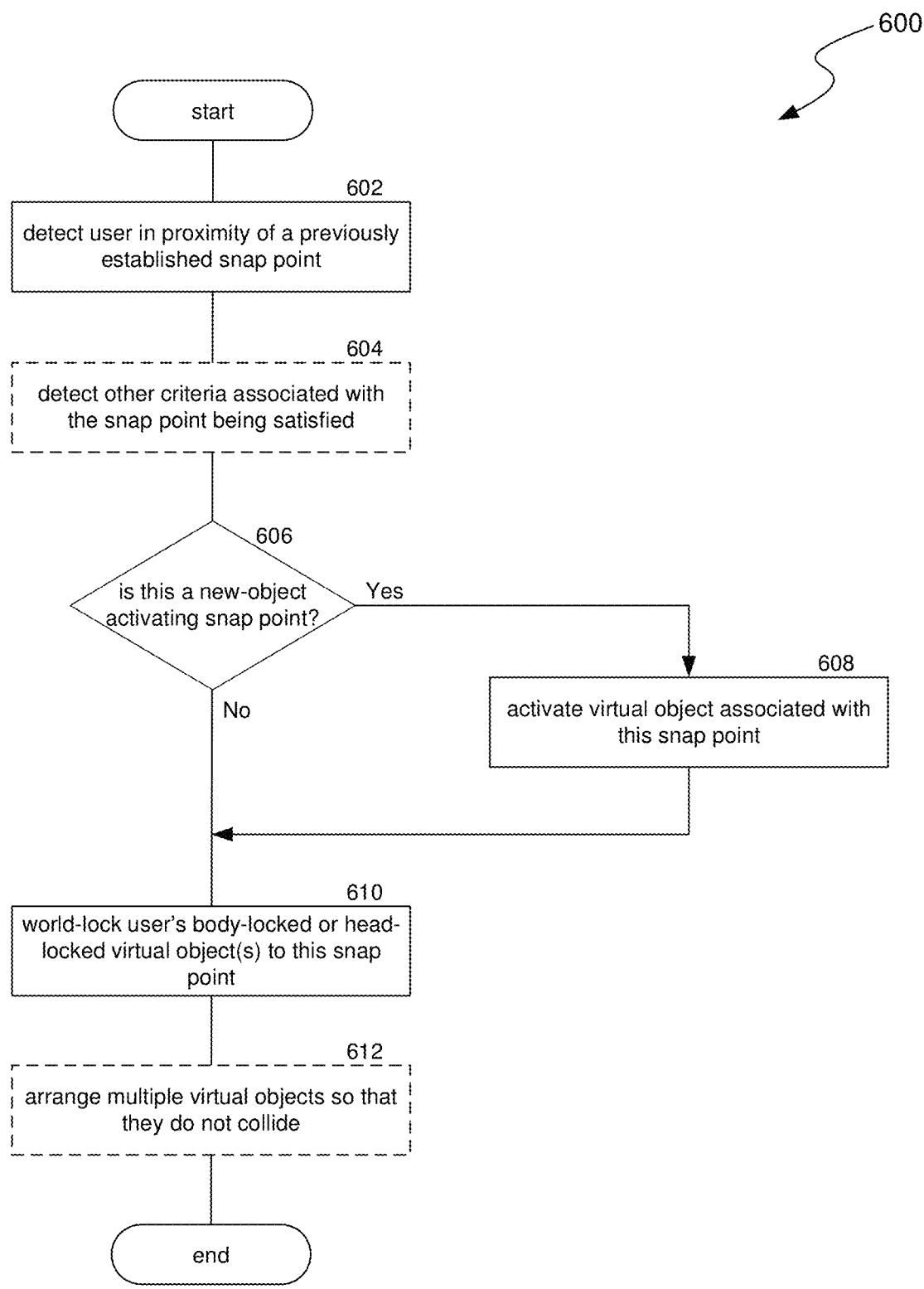
FIG. 6 is a flow diagram illustrating a process used in some implementations of the present technology for activating a snap point.

FIG. 6 is a flow diagram illustrating a process 600 used in some implementations for interacting with a previously defined snap point. Process 600 runs as long as the user is in the artificial reality environment. The snap point might have been defined earlier by a process such as process 500 of FIG. 5. Process 600 can run as an application of the user's artificial reality environment and can run on the user's local XR system. In some variations, process 600 can run on an XR server remote from the user.

At block 602, process 600 detects that a user is stationary at the location associated with a snap point. Block 502 above discusses other location-related criteria that can be associated with a snap point, such as the user's proximity to the location and duration at the location. In some variations, a snap point can only be activated by a specified set of authorized users, e.g., the snap point's author. In some variations, a snap point is available to the public at large. In some variations, the artificial reality environment may visually display the snap point at its location to the user. Even if the artificial reality environment visually displays the snap point, in some variations, it only displays the snap point to users who are allowed to activate it. In some variations, the artificial reality environment only displays a snap point to users who are allowed to activate it and when all of the criteria associated with the snap point are satisfied. For the latter consideration, see the discussion of blocks 504 through 514 of FIG. 5 and block 604 below.

At block 604, process 600 considers other criteria that are associated with this snap point. (For a few examples of these other criteria, see the above discussion of blocks 504 through 514 of FIG. 5.) If all of these criteria are satisfied, then the snap point is activated, and process 600 continues at block 606. If some of these criteria are not satisfied, then the snap point is not activated, and process 600 returns to block 602.

Entering block 606, the criteria associated with the snap point have been satisfied, and the snap point is activated. Process 600 at block 606 considers whether this snap point has a particular virtual object associated with its activation. See the discussion of this possibility at block 514 of FIG. 5. If so, then process 600 continues at block 608.

At block 608, process 600 activates (e.g., unhides, invokes, or otherwise causes display of) the particular virtual object associated with this snap point. FIG. 7C and the accompanying text illustrate a scenario where a snap point is associated with, and activates, a virtual recipe object.

Process 600 continues at block 610 either directly from block 606 or from block 608. At block 610, if the user has at least one leashed virtual object, that object can be "unleashed" and world-locked to a position associated with the snap point. (The situation where the user has multiple leashed virtual objects is discussed below in relation to block 612.) This scenario is illustrated by FIG. 7B and the accompanying text.

In some scenarios, a snap point may be configured to cause a leashed virtual object to snap to the world-locked location, but the user may not have that virtual object leashed (e.g., it may be closed or hidden). In this case, block 610 may do nothing or may cause the associated virtual object to be displayed and snapped to the world-locked location of the snap point. Process 600 may log the prior status of the virtual object so when the snap point is deactivated (e.g., the user move a threshold distance away) the virtual object can return to its prior state.

At block 612, process 600 applies collision-avoidance techniques if they were set for this snap point at, for example, block 516 of FIG. 5 or by an XR system default procedure. In some variations, the set of virtual objects to be world-locked around the snap point (which may include a particular virtual object as discussed above in relation to block 608) are arranged in such a manner that the more important ones are given prominence of place and that none of the displays overlap or otherwise collide.

In some variations, when the criteria associated with the snap point are no longer satisfied, e.g., the user leaves the location associated the snap point, then the actions of blocks 608, 610, and 612 can be "undone." Virtual objects activated at block 608 can be de-activated, and virtual objects world-locked at block 610 can be returned to their leashed mode.

Figure 7A:
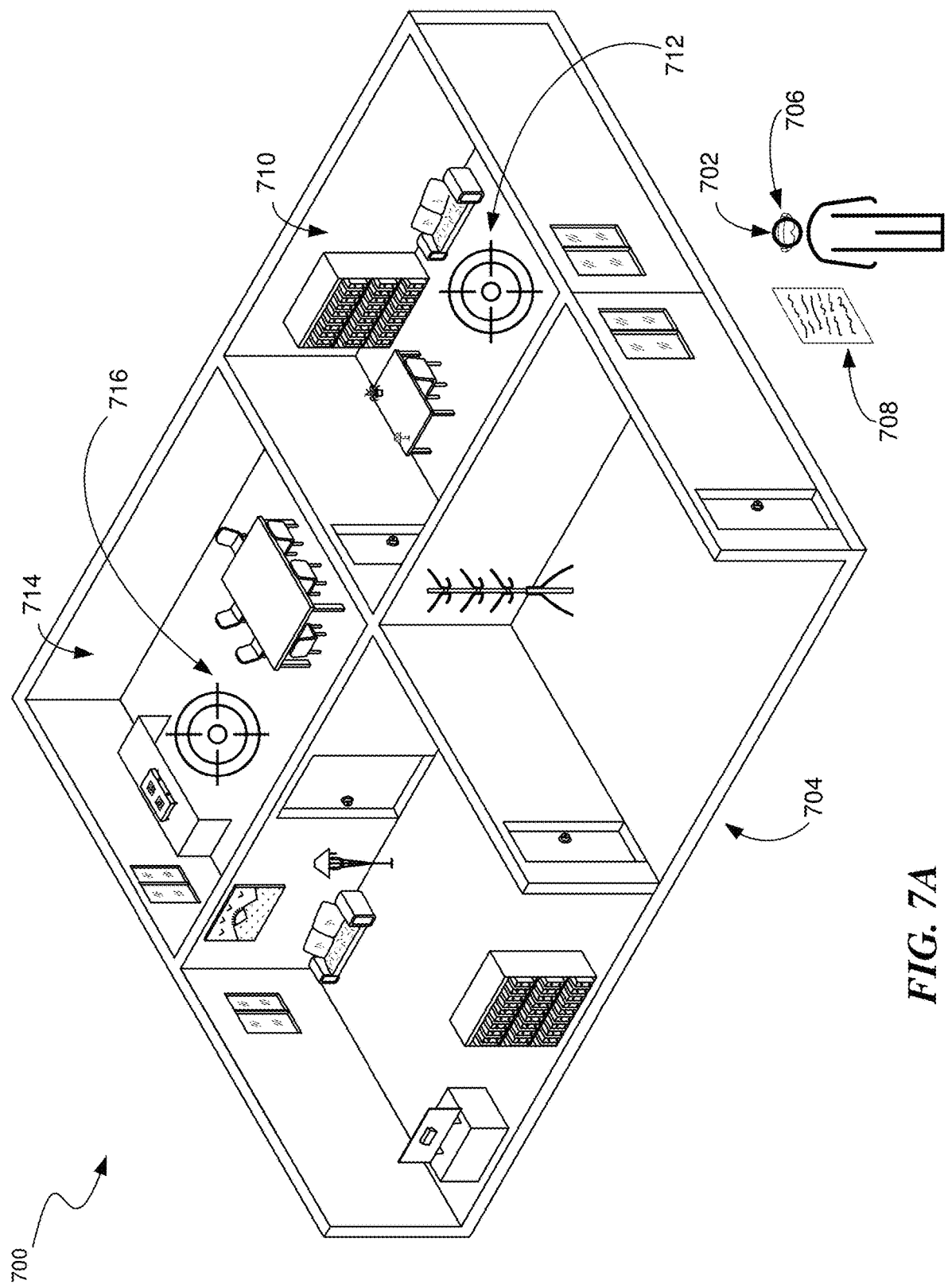
FIG. 7A is a conceptual diagram illustrating an example where a user has set two snap points in his home.
Figure 7B:
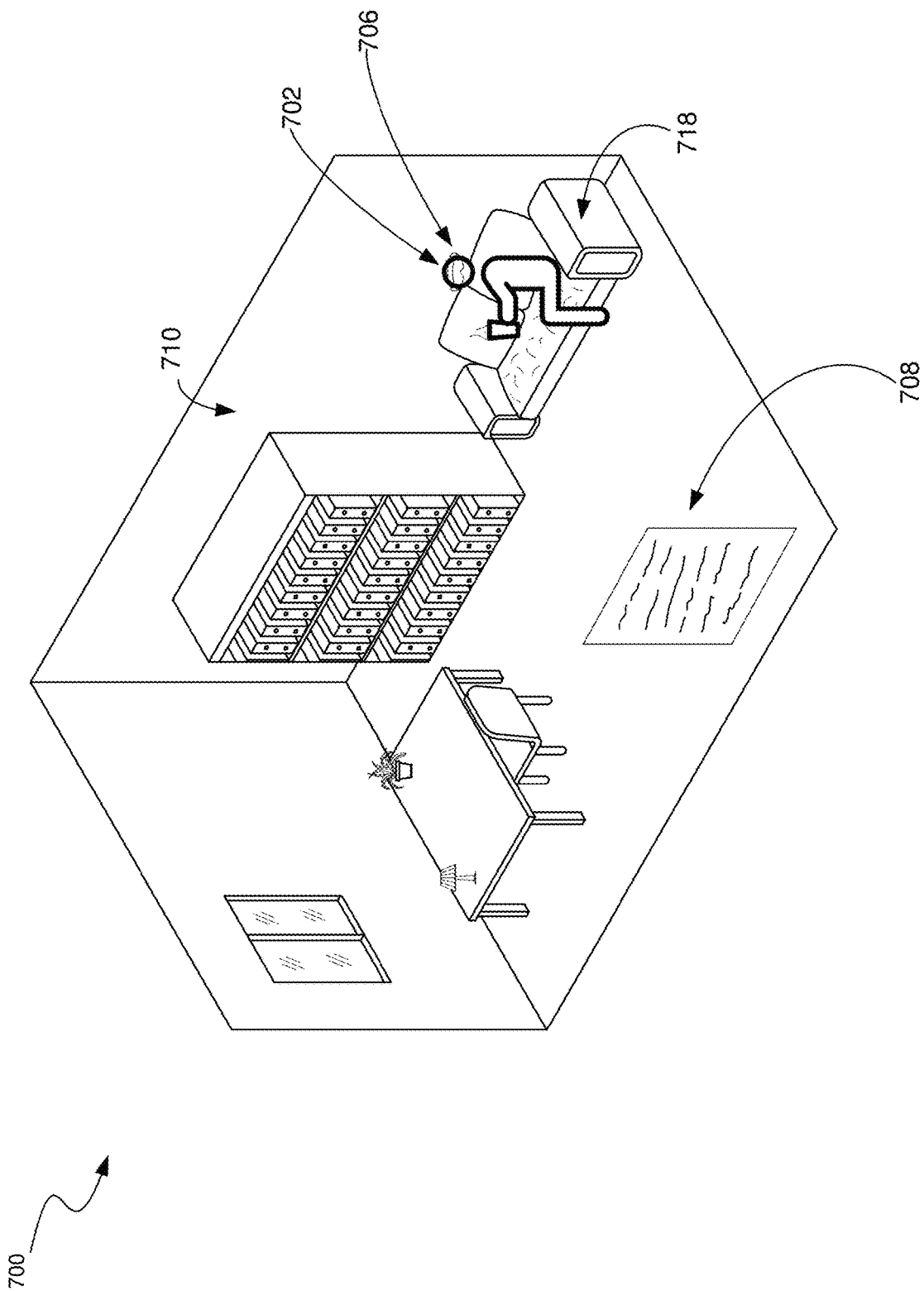
FIG. 7B is a conceptual diagram illustrating an example where a user has activated a snap point in his study.
Figure 7C:
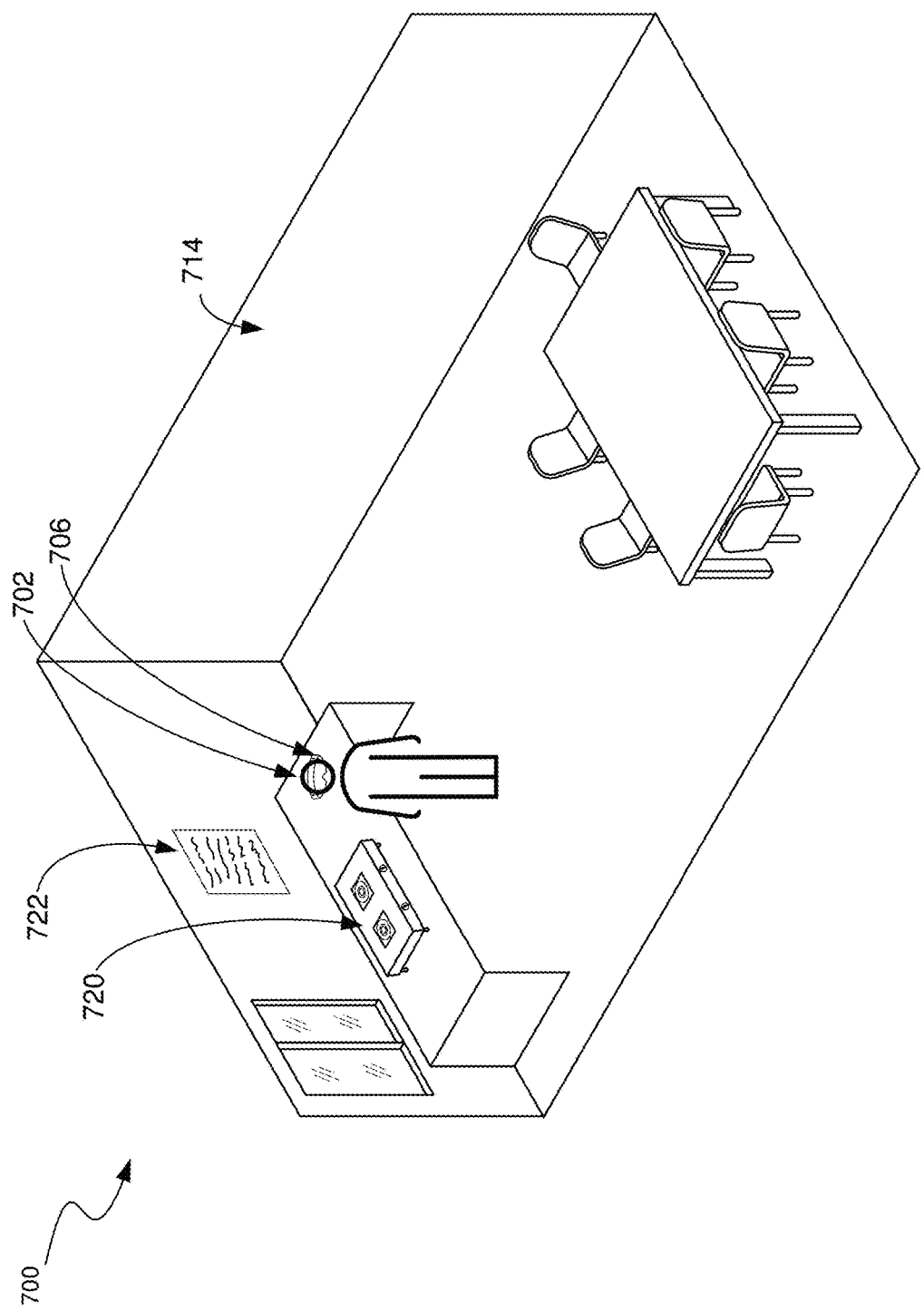
FIG. 7C is a conceptual diagram illustrating an example where a user has activated a snap point in his kitchen.

FIG. 7A is a conceptual diagram illustrating an example scenario 700 of an artificial reality environment in which a user has defined two snap points.

The user 702 is approaching his home 704. He is in a mixed-reality environment as indicated by his HMD 706. Leashed to the user is a display 708 generated by a virtual tablet object and made visible to the user 702 through his HMD 706.

The user 702 has previously defined (e.g., via the process 500 of FIG. 5) two snap points in his home 704. The first is in the study 710. That snap point 712 has been associated with the user 702 sitting stationary on his couch for a threshold amount of time and gazing level at the far wall.

A second snap point 716 was set in the kitchen 714 by the user 702. The criteria for this snap point 716 include: standing near the stove for a threshold amount of time and determined to be engaged in preparing a meal. The snap point 716 is associated with a particular virtual recipe object.

In the scenario of FIG. 7B, the user 702 has entered his home 704, walked into the study 710, and has been sitting stationary on a couch 718 for at least a threshold amount of time (e.g., 1, 2, or 5 seconds). He's gazing is directed toward the far wall. Importantly, that means that he is not gazing downward toward a book or toward a television set (not shown). The user's XR system determines all of this, possibly by applying the techniques discussed above in relation to FIG. 6 and in relation to the user-context detector 436 of FIG. 4, and activates the previously defined snap point 712 (see FIG. 7A). When that snap point 712 is activated, the user's leashed virtual tablet object display 708 is unleashed from him and is world-locked to a location in the direction of the far wall, as specified by the snap point 712. By world-locking the display 708, the user 702 can view it more comfortably without having the display 708 bounce around tracking his every involuntary movement.

After a while, the user 702 stands up from the couch 718 and walks away. The user's XR system notes that the criteria associated with the snap point 712 are no longer satisfied. Because of that, the snap point 712 becomes deactivated, and the virtual tablet display 708 is removed from its world-locked mode and re-leashes itself to the user 702.

In the scenario of FIG. 7C, the user 702 has walked into the kitchen 714. He has been standing in front of the stove 720 for at least a threshold amount of time, and the user-context detector 436 has determined that the user 702 is starting to prepare a meal. With that, the criteria associated with the kitchen snap point 716 (see FIG. 7A) are all satisfied.

As mentioned above, this snap point 716 has associated with it a particular virtual object recipe display 722. (See the discussion at block 514 of FIG. 5 for a description of this.) When the snap point 716 is activated, that recipe display 722 is presented to the user 702 in the direction of the wall above the stove 720 where the user 702 can readily view it through his HMD 706 while preparing the meal.

Because the user 702 has found that the virtual tablet display 708 (see FIG. 7A) is a distraction while he is cooking, he has set the criteria for the snap point 716 so that his leashed virtual objects are de-activated as long as the particular virtual object recipe display 722 is active. Thus, as illustrated in FIG. 7C, the user 702 sees the recipe display 722 but not the virtual tablet display 708.

When the user 702 is done cooking, as noted by the user-context detector 436 when the user 702 leaves the proximity of the kitchen snap point 716 for at least a threshold amount of time, and sits down to eat the meal he just prepared, the snap point 716 becomes deactivated, the virtual recipe object 722 is de-activated, and the virtual tablet display 708 can return either to its leashed mode or be world-locked to another snap point (not shown) previously defined in relation to the user's table.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for activating a snap point in an artificial reality environment, the method comprising:
   detecting that criteria associated with a snap point are satisfied by determining:
      that a user is within a threshold distance of a location, defined for the snap point, for at least a threshold amount of time, and
      that the user is engaged in a specified activity based on an interaction, by the user, with a first virtual object in the artificial reality environment,
      wherein the specified activity, engaged in by the user, is determined based on:
         A) an association, established by the user, between the specified activity and the first virtual object, or
         B) known functions of the first virtual object,
      wherein the first virtual object is positioned relative to a portion of the user's body, and
      wherein the snap point was previously defined in response to a user selecting the location for the first virtual object, a second virtual object, or both, when the user was in view of that location; and in response to each of the criteria associated with the snap point being satisfied, performing one or both of:
　world-locking, relative to the location of the snap point, the first virtual object that, at the time of the detecting, was positioned relative to the portion of the user's body; and/or
　activating the second virtual object previously associated with the snap point.

2. The method of claim 1, wherein the criteria associated with the snap point further include the user gazing within a threshold angle of a specified direction.

3. The method of claim 1 including, in response to the each of the criteria associated with the snap point being satisfied, performing the world-locking, relative to the location of the snap point, of the first virtual object that was positioned relative to the portion of the user's body.

4. The method of claim 1 including, in response to the each of the criteria associated with the snap point being satisfied, performing the activating of the second virtual object previously associated with the snap point.

5. The method of claim 1, wherein:
　the snap point is one of multiple snap points activated when the user is within the threshold distance of a location; and
　the method further includes causing a plurality of third virtual objects, each associated with one of the multiple snap points, to be world-locked in relation to locations associated with the multiple snap points, wherein the world-locking of the plurality of third virtual objects includes arranging the plurality of third virtual objects so that they are not in collision with each other.

6. The method of claim 1 including:
　in response to the each of the criteria associated with the snap point being satisfied, performing the world-locking, to the location of the snap point, of the first virtual object that was positioned relative to the portion of the user's body;
　detecting that at least one of the criteria associated with the snap point are no longer satisfied; and
　in response to the at least one of the criteria associated with the snap point being no longer satisfied, positioning the first virtual object relative to the portion of the user's body.

7. The method of claim 1 including:
　in response to the each of the criteria associated with the snap point being satisfied, performing the activating of the second virtual object previously associated with the snap point;
　detecting that one or more of the criteria associated with the snap point are no longer satisfied; and
　in response to the one or more of the criteria associated with the snap point no longer being satisfied, de-activating the second virtual object.

8. A non-transitory computer-readable storage medium storing instructions that, when executed by a computing system, cause the computing system to perform a process for activating a snap point in an artificial reality environment, the process comprising:
　detecting that criteria associated with a snap point are satisfied by determining:
　　that a user is within a threshold distance of a location, defined for the snap point, for at least a threshold amount of time, and
　　that the user is engaged in a specified activity based on an interaction, by the user, with a first virtual object in the artificial reality environment,
　wherein the specified activity, engaged in by the user, is determined based on:
　　A) an association, established by the user, between the specified activity and the first virtual object, or
　　B) known functions of the first virtual object,
　wherein the first virtual object is positioned relative to a portion of the user's body, and
　wherein the snap point was previously defined in response to a user selecting the location for the first virtual object, a second virtual object, or both, when the user was in view of that location; and
　in response to each of the criteria associated with the snap point being satisfied, performing one or both of:
　　world-locking, relative to the location of the snap point, the first virtual object that, at the time of the detecting, was positioned relative to the portion of the user's body; and/or
　　activating the second virtual object previously associated with the snap point.

9. The non-transitory computer-readable storage medium of claim 8, wherein the criteria associated with the snap point further include the user gazing within a threshold angle of a specified direction.

10. The non-transitory computer-readable storage medium of claim 8, wherein the process includes the activating the second virtual object previously associated with the snap point, including causing the second virtual object to be displayed in the artificial reality environment, wherein the second virtual object was, before the activating, not displayed in the artificial reality environment.

11. The non-transitory computer-readable storage medium of claim 8, wherein the process includes, in response to the each of the criteria associated with the snap point being satisfied, performing the activating of the second virtual object previously associated with the snap point.

12. The non-transitory computer-readable storage medium of claim 8, wherein:
　the snap point is one of multiple snap points activated when the user is within the threshold distance of a location; and
　the process further includes causing a plurality of third virtual objects, each associated with one of the multiple snap points, to be world-locked in relation to locations associated with the multiple snap points, wherein the world-locking of the plurality of third virtual objects includes arranging the plurality of third virtual objects so that they are not in collision with each other.

13. The non-transitory computer-readable storage medium of claim 8, wherein the process includes:
　in response to the each of the criteria associated with the snap point being satisfied, performing the world-locking, to the location of the snap point, of the first virtual object that was positioned relative to the portion of the user's body;
　detecting that at least one of the criteria associated with the snap point are no longer satisfied; and
　in response to that the at least one of the criteria associated with the snap point no longer being satisfied, positioning the first virtual object relative to the portion of the user's body.

14. The non-transitory computer-readable storage medium of claim 8, wherein the process includes:
　in response to the each of the criteria associated with the snap point being satisfied, performing the activating of the second virtual object previously associated with the snap point;

detecting that one or more of the criteria associated with the snap point are no longer satisfied; and in response to the one or more of the criteria associated with the snap point no longer being satisfied, de-activating the second virtual object.

15. A computing system for activating a snap point in an artificial reality environment, the computing system comprising:

one or more processors; and one or more memories storing instructions that, when executed by the one or more processors, cause the computing system to perform a process comprising:

detecting that criteria associated with a snap point are satisfied by determining:

that a user is within a threshold distance of a location, defined for the snap point, for at least a threshold amount of time, and that the user is engaged in a specified activity based on an interaction, by the user, with a first virtual object in the artificial reality environment, wherein the specified activity, engaged in by the user, is determined based on:

A) an association, established by the user, between the specified activity and the first virtual object, or B) known functions of the first virtual object, wherein the first virtual object is positioned relative to a portion of the user's body, and wherein the snap point was previously defined in response to a user selecting the location for the first virtual object, a second virtual object, or both, when the user was in view of that location; and in response to each of the criteria associated with the snap point being satisfied, performing one or both of:

world-locking, relative to the location of the snap point, the first virtual object that, at the time of the detecting, was positioned relative to the portion of the user's body; and/or activating the second virtual object previously associated with the snap point.

16. The computing system of claim 15, wherein the process includes, the in response to the each of the criteria associated with the snap point being satisfied, performing the activating of the second virtual object previously associated with the snap point.

17. The computing system of claim 15, wherein:

the snap point is one of multiple snap points activated when the user is within the threshold distance of a location; and the process further includes causing a plurality of third virtual objects, each associated with one of the multiple snap points, to be world-locked in relation to locations associated with the multiple snap points, wherein the world-locking of the plurality of third virtual objects includes arranging the plurality of third virtual objects so that they are not in collision with each other.

18. The computing system of claim 15, wherein the process includes:

in response to the each of the criteria associated with the snap point being satisfied, performing the world-locking, relative to the location of the snap point, of the first virtual object that was positioned relative to the portion of the user's body;

detecting that one or more of the criteria associated with the snap point are no longer satisfied; and in response to the one or more of the criteria associated with the snap point being no longer satisfied, positioning the first virtual object relative to the portion of the user's body.

19. The computing system of claim 15, wherein the process includes:

in response to the each of the criteria associated with the snap point being satisfied, performing the activating of the second virtual object previously associated with the snap point;

detecting that one or more of the criteria associated with the snap point are no longer satisfied; and in response to the one or more of the criteria associated with the snap point being no longer satisfied, de-activating the second virtual object.

20. The computing system of claim 15, wherein the criteria associated with the snap point further include the user gazing within a threshold angle of a specified direction.

\* \* \* \* \*